United States Patent Office 2,847,903
Patented Aug. 19, 1958

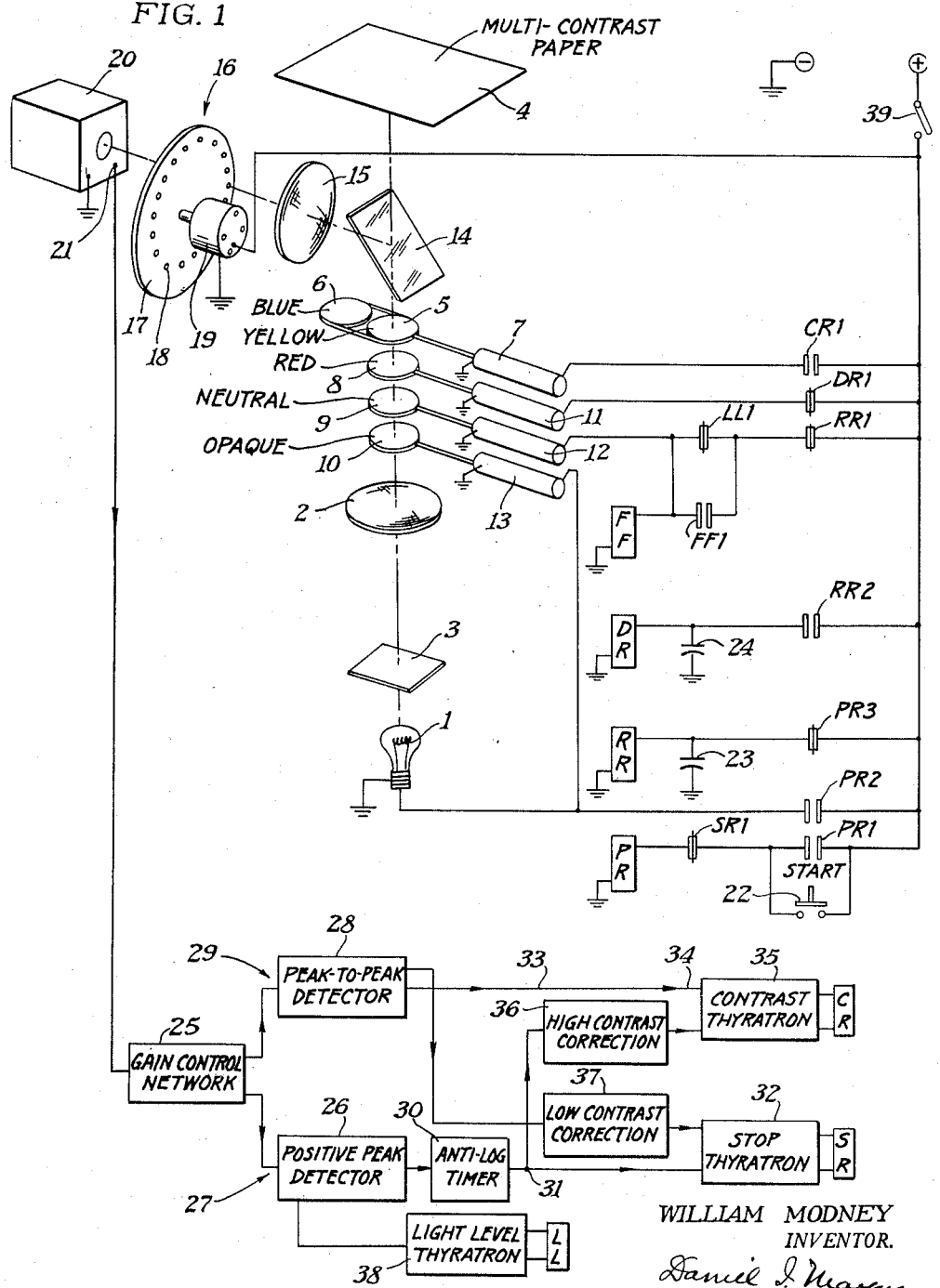

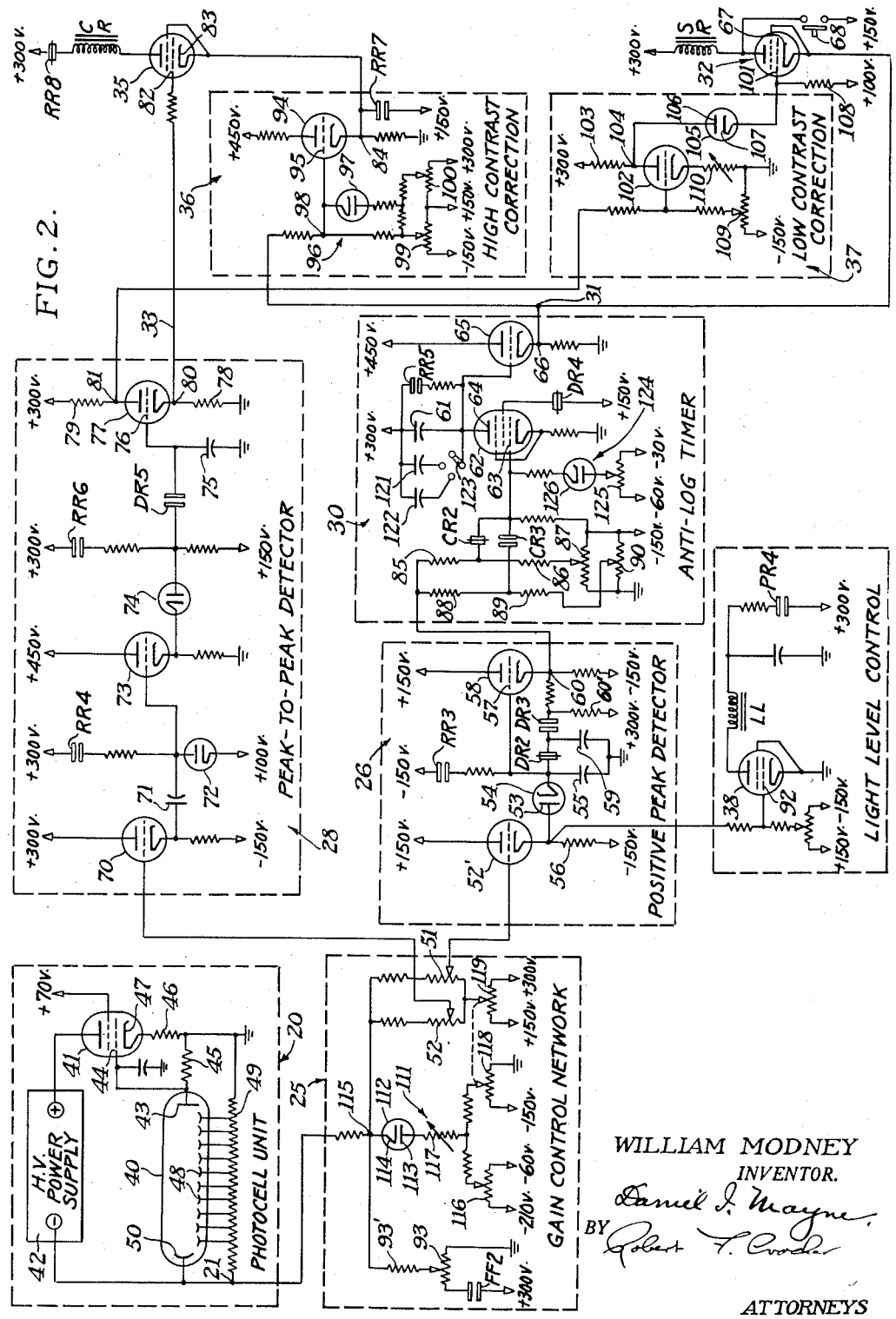

2,847,903

MULTICONTRAST PRINTER CONTROL UNITS

William Modney, Rochester, N. Y., assignor to Eastman Kodak Company, Rochester, N. Y., a corporation of New Jersey Application January 27, 1955, Serial No. 484,367

10 Claims. (Cl. 88—24)

This invention relates to an automatic control system for photographic printers particularly intended for use with variable-contrast printing paper.

In order to obtain the best quality positive photographic prints, it is necessary that the exposure time and "hardness" of the printing paper be carefully matched to the individual negative. Thus, the degree of exposure should be primarily controlled in accordance with the lightest or minimum density part of the negative, while the grade of printing paper which should be employed should be governed primarily by the degree of contrast or density range in the negative.

In recent years there has come into use a type of printing paper, known as variable-contrast paper, the effective hardness of which may be varied over relatively wide limits by the use of appropriately colored filters in the beam of light used for printing. For example there is commercially available paper of this type which will act as a "soft" paper when exposed to yellow light and as "hard" paper when exposed to blue light. Thus by varying the color of the filter used, or by changing filters during the printing process, the paper may be given any desired degree of effective hardness between relatively wide limits.

It is an object of this invention to provide a control system for photographic printers using such variable-contrast paper, wherein high quality positive prints may be automatically obtained despite wide variations in density and contrast between individual negatives.

A further object is to provide such a control system wherein even those negatives which lie considerably outside of the normally acceptable range, may likewise be successfully printed without requiring any special action or adjustment on the part of the operator.

A still further object is to provide such a control system which is primarily electronic in nature and which may be readily adjusted to accommodate various sensitivities of printing paper and wide variations in operating conditions and components.

Further objects and advantages will become apparent from the following description and claims, especially when considered in conjunction with the accompanying drawings.

Basically the invention comprises means rendered effective at the beginning of a printing cycle for scanning the negative to be printed, element by element, to obtain an electrical signal which varies in amplitude with the element-to-element density of the negative. The signal peak corresponding to the point of minimum density in the negative is then utilized to control the duration of the exposure, while the peak-to-peak amplitude of the signal, which corresponds to the density range or contrast in the negative, serves to control the effective hardness of the printing paper and thereby the contrast in the finished print. At the end of the cycle the unit will automatically be restored to a condition ready for the next printing cycle. Once the unit is properly adjusted, the only action required on the part of the operator to print any negative is to insert the desired negative in printing position and to then press a start button.

Figure 1 is a diagrammatic showing of my invention applied to a photographic printer.

Figure 2 is a schematic diagram of those portions of the electronic control system which are shown in block diagram form in Fig. 1.

As will become apparent from the following description my improved control system is readily applicable to any conventional photographic printer and, to avoid confusion, only those portions of such a printer which are essential to an understanding of the invention, are shown in the drawing. In Fig. 1 a typical projection printer is diagrammatically represented as comprising a light source 1 and a suitable lens system 2 for projecting an image of the negative or original 3 onto photo-sensitive printing paper 4. As above mentioned, the paper employed is of the variable-contrast type which acts as "hard" paper when exposed to blue light and as "soft" paper when exposed to yellow light. My invention contemplates controlling the effective hardness of the paper, and thereby the contrast of the finished print, by the use of selectively shiftable yellow and blue filters 5 and 6, yellow filter 5 normally being in operative position at the start of the exposure period and being replaced by the blue filter 6 at an intermediate point in the exposure period which is dependent upon the density range present in the negative. Filters 5 and 6 may conveniently be mounted side-by-side and may be selectively shifted into operative position as by a suitable solenoid 7. Also arranged to be selectively interposed in the beam of light between the light source 1 and the paper 4 are a red filter 8, a neutral filter 9 and an opaque filter or shutter 10, each of which is normally urged, as by suitable spring devices (not shown), into the position illustrated and which are adapted to be shifted out of the path of light from the lamp 1 to the paper 4 upon energization of their respective solenoids 11, 12 and 13.

Located between the filters and the paper 4 is a beam splitter, such as a half-silvered mirror 14 which, when shutter 10 is retracted, deflects a portion of the light passing through the negative 2, to a lens 15 arranged to form an image of the negative substantially in the plane of a scanner 16. Scanner 16 may be of any known type and, for purposes of illustration is shown as comprising a disk 17 provided with a series of helically arranged openings 18 adapted, upon rotation of the disk, as by motor 19, to sequentially sweep past the image of the negative 3 so as to scan it elemental area by elemental area, and to pass on to an adjacent photocell unit 20 a light beam which will be modulated in accordance with the element-by-element light-transmitting characteristics of the negative. As was previously mentioned, and as will be explained in more detail herebelow, photocell unit 20 incorporates a feed-back arrangement such that the voltage at its output 21 varies as a logarithmic function of the light falling thereon and corresponds therefore at any time to the density of that area of the negative which is being scanned at that particular time.

Energization of the lamp 1 and of the various solenoids 7, 11, 12 and 13 is under the control of a plurality of relays incorporated in an electronic control system. In order to best illustrate the manner in which these various relays are themselves controlled, as well as the manner in which they cooperate with the rest of the system, the relays are shown in Figs. 1 and 2 with their various sets of contact points disassociated from their actuating coils. In each case the relay is designated by reference letters applied to its actuating coil and indicative of its primary function, while the sets of contacts for that relay are designated by the same letters followed by an appropriate numeral. In the drawing all relay contacts are shown as they would be with their associated relay coils de-energized.

Thus, contrast relay CR, whose primary function is to control the shifting of the blue and yellow filters by solenoid 7, includes normally open points CR1 shown in series with solenoid 7, in Fig. 1, as well as normally closed points CR2 and normally open points CR3, shown in Fig. 2, and the function of which will be explained herebelow in conjunction with the detailed discussion of that figure.

Print relay PR serves primary to initiate a printing cycle when Start switch 22 is pressed. It includes normally open points PR1 and PR2 which serve respectively to maintain a self-holding circuit for the relay when the Start switch is released, and to control the lighting of lamp 1 and the energization of shutter actuating solenoid 13 at the beginning of the printing cycle. Its normally closed points PR3 control the energization of reset relay RR while its normally open points PR4 (Fig. 2) control light level relay LL.

Reset relay RR, which is energized when print relay PR drops out at the end of a printing cycle (by its points RR3 to RR8, shown in Fig. 2) serves primarily to restore various electronic circuits, shown in that figure, to proper condition for the start of the next printing cycle. This relay RR is provided with a condenser 23 in parallel with the actuating coil thereof whereby to provide a short time delay between the opening of its supply circuit and the restoring of its contact points to their normal, de-energized condition. Its normally closed points RR1 serve to insure that the neutral filter solenoid 12 will be deenergized at the start of a printing cycle so that the neutral filter 9 will be in operative position at that time. Its normally open points RR2 control the energization of delay relay DR, which is likewise provided with a parallel condenser 24 to cause an additional delay between the time when its supply circuit is broken and the actuation of its contact points.

Delay relay DR serves primarily to establish a short scanning interval between the pressing of the Start button 22 and the start of the actual exposure. When its points DR1 close at the expiration of this scanning interval they serve to energize solenoid 11 to retract red filter 8 and thus to start the actual printing exposure, while its points DR4 (Fig. 2) simultaneously close to start the operation of the exposure timer. The function of its points DR2, DR3 and DR5, shown in Fig. 2, will be later explained.

Light level relay LL and filter factor relay FF serve conjointly to control the energization of the solenoid 12 for the neutral filter 9, the purpose of which will be later explained.

Stop relay SR, whose energization signals the end of the exposure period, serves, by opening its points SR1, to drop the print relay PR to cause light 1 to extinguish and shutter 10 to be restored to its operative position to thereby terminate the exposure of the paper 4.

As shown in block diagram form in Fig. 1 and in detail in Fig. 2, contrast relay CR, stop relay SR and light level relay LL are controlled in accordance with the output of the photocell unit 20. The fluctuating signal from the photocell is applied to a gain control and correction network 25 from which voltages proportional to the photocell signal, and hence to the density of the negative, are applied to a positive peak detector 26 in exposure control channel 27 and to a peak-to-peak detector 28 in contrast control channel 29.

Peak detector 26 applies a voltage proportional to the minimum density in the negative to an electronic timer 30 which produces at its output 31 a linearly-varying D. C. voltage which drops from a predetermined initial value at a rate proportional to the anti-logarithm of the minimum density. When this voltage falls to a predetermined value it triggers a thyratron 32 which energizes the stop relay SR to end the exposure cycle. Thus the duration of the exposure is primarily dependent upon the amount of light passing through the least dense part of the negative.

In the contrast channel 29, peak-to-peak detector 28 produces at its output 33 a positive voltage which is indicative of the density range or contrast in the negative. This voltage is applied as at 34 to the grid of a second thyratron 35 which controls contrast relay CR. A voltage proportional to the output from the timer 30 is also applied through a high contrast correction network 36 (the purpose of which will be later described) to the cathode of thyratron 35. Thus when the timer output voltage has fallen to a value having a predetermined relationship to the voltage from the peak-to-peak detector, the contrast thyratron 35 will fire to energize contrast relay CR and to bring about the shifting of the yellow and blue filters. As will be further explained herebelow a second output voltage from the peak-to-peak detector 28 is also applied to a low contrast correction network 37 which in turn controls the grid voltage on stop thyratron 32 to slightly vary its time of operation in the case of negatives of lower-than-normal contrast.

Light level thyratron 38 is responsive to the signal applied to the input of the positive peak detector 26 and is arranged to be triggered prior to the beginning of the actual exposure period so long as the light passing through the least dense area of the negative with the neutral filter 9 in operative position, is sufficiently intense to permit high speed operation of the printer. Its firing energizes light level relay LL which opens its points LL1 to prevent the energization of neutral filter solenoid 12.

Before proceeding with the detailed description of the various circuits shown in Fig. 2, a description of the sequence in which the various relays and components shown in Fig. 1 operate during a complete printing cycle is believed to be in order.

When switch 39 is first closed to prepare the unit for operation, scanner motor 19 will be energized to put the scanning disk 17 in motion, and reset relay RR will simultaneously be energized through the closed print relay points PR3. Points RR2 will thereupon close to energize relay DR which by opening its points DR1 will maintain red filter solenoid 11 de-energized. Points RR1 of the reset relay will likewise open to maintain neutral filter solenoid 12 and filter factor relay FF de-energized. As will later be apparent, contrast relay CR, stop relay SR and light level relay LL will all be de-energized as will also be print relay PR. Thus in this stand-by or reset condition the yellow, red, and neutral filters 5, 8 and 9 and the opaque shutter 10 will be in the operative position shown in Fig. 1. Lamp 1 will be extinguished and the scanning disk 17 will be rotating.

Assuming now that the desired negative 3 and paper 4 have been brought into proper position, Start switch 22 is pressed to energize print relay PR to start a printing cycle. Points PR1 thereupon close to hold relay PR energized until the end of the cycle, while points PR2 close to illuminate lamp 1 and to energize solenoid 13 to retract shutter 10 into its inoperative position. Points PR3 will also be opened thus opening the supply circuit to relay RR.

However, due to the energy stored in condenser 23, relay RR will become de-energized relatively slowly and its points will not return to their normal de-energized position shown until a short time interval has elapsed. During this interval, which will be called the preliminary scanning interval, lamp 1 will build up to its normal operating intensity and light from this lamp will pass through the neutral, red and yellow filters, both to the printing paper 4 and, by way of the scanner, to the photocell unit 20. Since the paper 4 is insensitive to light passing through a red filter no printing will take place at this time. However, the photocell is sensitive to such light and there will therefore be produced at the output 21 of the photocell unit an output signal which is modulated in accordance with the density variations in the negative.

As previously described if the peak intensity of this signal is above a predetermined minimum, relay LL will be energized to insure that the neutral filter will remain in the beam of light when points RR1 of the reset relay close at the expiration of the delay period. On the other hand if the peak intensity is too low for high-speed printing with the neutral filter in the beam, relay LL will remain de-energized and, when reset relay points RR1 close, a circuit will be completed to energize neutral filter solenoid 12 and filter factor relay FF. The points FF1 will thereupon close to hold both relay FF and solenoid 12 energized until relay RR is again energized at the end of the exposure cycle. Thus this first time delay period affords an opportunity for the lamp 1 to come up to full brilliance and also for determining whether sufficient light will be able to pass through the negative to give the desired high speed operation with the neutral filter in position, and if not, to prepare the circuits so that the filter will be automatically retracted at the end of this delay period to let more light pass.

When reset relay RR times out to signal the end of this preliminary scanning period, its points RR2 will open to break the supply circuit to delay relay DR. This relay DR will similarly de-energize slowly due to the action of condenser 24 and will thereby establish a second time delay interval. This second delay period constitutes the useful scanning period during which the positive peak detector 26 in the exposure channel 27 and the peak-to-peak detector 28 in the contrast channel 29 are rendered operative (by the return of the various points of reset relay RR, shown in Fig. 2, to their normal, de-energized positions) to effectively measure the minimum density of the negative (for subsequently controlling the exposure time) and the density range or contrast in the negative (to determine the relative proportion of the total exposure time which should be allotted to printing through the yellow and blue filters so as to give the proper contrast in the finished print).

When relay DR times out at the end of this second delay period, points DR1 close to energize solenoid 11 to retract the red filter 8 from its operative position and thus to initiate actual exposure of the printing paper 4. At the same time, as previously explained, points DR4 of this delay relay will start the anti-log timer 30 in operation. At some point in the exposure period depending upon the contrast in the negative, contrast relay CR will be energized, closing its points CR1 to energize solenoid 7 thus shifting the blue filter 6 into operative position in place of the yellow filter. The paper 4 will thereupon act as a "hard" paper for the remainder of the exposure period.

At the end of the exposure period stop relay SR is automatically energized, its points SR1 thereupon opening to de-energize print relay PR, which, in turn opens its points PR2 to extinguish the lamp 1 and to return the shutter 10 to the light-blocking position as shown in Fig. 1. Points PR3 close to again energize reset relay RR which in turn re-energizes delay relay DR.

The various relays will remain in this reset or stand-by condition until the Start switch 22 is again pressed to start a new cycle.

Turning now to the detailed circuitry shown in Fig. 2, photocell unit 20 is seen to comprise a photo-multiplier tube 40 and a feedback amplifier tube 41 connected in series across a suitable high voltage supply 42. The anode 43 of the photo-multiplier tube 40 is connected directly to the grid 44 of tube 41 and, through series resistors 45 and 46, to the cathode 47 of this tube. The dynodes 48 of tube 40 are connected to suitable taps on a voltage divider 49 connected from the junction of resistors 45 and 46 (which junction is grounded) to the light sensitive cathode 50 of the phototube. With this arrangement the voltage at output terminal 21 will be negative with respect to ground, its value at any time depending upon the intensity of the light falling on the cathode 50, and, as is fully explained in the U. S. Patent No. 2,454,871 to Gunderson, its value varying linearly with the element-to-element density of the negative being scanned. The least negative, or most positive, peaks in the output signal will correspond to points of minimum density while the most negative peaks will correspond to points of maximum density. The difference between the most positive and the most negative peaks will correspond to the density range or contrast in the negative.

The output signal from the photocell unit is applied to the gain control and correction unit 25 which is essentially a resistance voltage-dividing network for applying the desired proportion of the fluctuating output from the photocell unit, at an appropriate D. C. level with respect to ground, to the inputs of the exposure control and contrast control channels. To this end the unit 25 includes a potentiometer 51 for controlling the signal applied to the positive peak detector 26 and a separately adjustable potentiometer 52 for controlling that applied to the peak-to-peak detector 28.

Considering first the exposure control channel, the signal from potentiometer 51 is applied through a cathode follower 52' to the anode 53 of a diode 54 connected in series with a condenser 55 which has one side grounded. This condenser will, prior to the start of the scanning cycle, have been charged negatively to a predetermined voltage through points RR3 of the reset relay which, as previously described, are closed throughout the stand by period. Thus, when points RR3 open at the start of the useful scanning cycle, condenser 54 will be charged by the positive peaks passing through diode 53 to a voltage corresponding to the most positive peak in the scanning signal. As will later appear, the voltage standing on this condenser serves to control the rate of change in the timer output voltage and thus determines the duration of exposure. The charging path for this condenser 55 includes the cathode resistor 56 of the cathode follower 52 and, since the duration of the positive peaks is often extremely short, it is necessary to employ a relatively small capacity condenser in order to keep the time constant of the charging circuit sufficiently low to ensure that the condenser will charge substantially to the peak value during this short time interval. On the other hand, it is desirable to have a relatively large storage capacity available in the peak detector so that the effect of stray leakage will be minimized and the voltage variations due to this cause will be negligible. To this end the following arrangement is provided.

The voltage in the condenser 55 is applied to the grid 57 of a second cathode follower 58. A second, relatively large capacity condenser 59, is arranged to be connected through a resistor 59' and the points DR3 of the delay relay DR (which points will be closed during the useful scanning period) to the output 60 of cathode follower 58 so that the voltage on condenser 59 will tend to follow that on condenser 55. The D. C. level of the voltage on condenser 59 is maintained above that on condenser 55 by virtue of a relatively high resistance connection through resistor 60' to a source of positive voltage. It should be noted that at this time points DR2 of the delay relay will be open so that, during the useful scanning period, condenser 59 is effectively isolated from condenser 55. Thus, while the charging circuit for condenser 59 will itself have a relatively long time constant, it will not affect the time constant of the charging circuit for condenser 55. Despite the relatively long time constant involved in its own charging circuit, condenser 59 will have ample time to charge to a value representative of the most positive signal peak before relay DR drops out to signal the start of the exposure period.

When this occurs points DR2 and DR3 return to their normal de-energized position shown in Fig. 2 thereby disconnecting condenser 59 from the output of cathode follower 58 and connecting it in parallel with condenser 55 across the input of this tube. Due to the relatively large capacity of condenser 59, the voltage on condensers 59 and 55 will equalize at a D. C. level still considerably above that previously appearing on condenser 55. Thus despite the fact that, upon the retraction of the red filter to start the exposure cycle, the positive peaks at the output of cathode follower 52' will be higher than during the useful scanning period, the voltage on condensers 55 and 59 will be sufficiently high to maintain the diode 54 blocked so that these peaks will not affect the operation.

The combined capacity of the two condensers 55 and 59 is more than sufficient to render negligible any leakage losses and to thus insure that the voltage at the output 60 of the peak detector 26 will remain substantially constant throughout the subsequent exposure period.

The anti-log electronic timer 30 used to control the duration of the exposure employs a relatively large-capacity timing condenser 61 connected in series with a pentode tube 62 of the variable-mu type so that the condenser will be charged by the anode current flowing through the tube. Such variable-mu pentodes have substantially logarithmic grid voltage-anode current characteristics such that, over relatively wide ranges of plate and grid voltages, the anode current will be substantially directly proportional to the anti-log of the voltage applied to the grid. Thus the rate at which the voltage across condenser 61 will change, and therefore the time required for it to change between predetermined limits, will vary anti-logarithmically with the voltage applied to the grid 63.

At the beginning of a printing cycle, condenser 61 will have no charge thereon since it will have been shorted by the reset relay points RR5 at the end of the previous cycle. Operation of timer 30 is initiated by the closing of points DR4 of the delay relay to apply screen potential to the pentode when the delay relay times out to signal the beginning of the actual exposure period. At this time a predetermined proportion of the voltage appearing at the output 60 of the positive peak detector 26 will be applied through normally closed points CR2 of the contrast relay CR to the grid 63 of the pentode 62, causing the latter to pass anode current at a rate proportional to the anti-log of the grid voltage. Since this voltage is itself proportional to the minimum density in the negative, the charge on the condenser will increase at a rate proportional to the actual amount of light passing through the minimum density area of the negative. Since the condenser 61 is between the plate 64 of the pentode and the positive supply, the voltage at the plate will therefore decrease linearly from its initial predetermined value. This voltage is applied to a cathode follower 65, to produce a corresponding linearly decreasing timer output voltage at its output terminal 66. As shown this timer output voltage is applied to the cathode 67 of stop thyratron 32 which, when the cathode voltage has fallen to a value bearing a predetermined relationship to that appearing on the grid 68 thereof, will become conductive so as to energize stop relay SR, which is connected in series therewith, to terminate the exposure as previously described.

A manual Stop switch 68 is provided for manually energizing stop relay SR, if at any time it is desired to interrupt the normal printing cycle.

Turning now to the contrast control channel, during the scanning period a desired proportion of the photocell output signal is applied by the potentiometer 52 in the gain control network 25 to a cathode follower 70 which constitutes the input stage of the peak-to-peak detector 28. The output of cathode follower 70 is applied to a condenser 71 and diode 72 connected in series so as to constitute a D. C. restorer which is effective to bring the most positive peak in the signal to a predetermined D. C. level. The restored signal is then applied through a second cathode follower 73 to a negative peak detector comprised by a diode 74 and condenser 75, which will be connected together through relay points DR5 during the scanning periods.

Condenser 75 will initially have a positive charge thereon which corresponds to the D. C. level to which the most positive peak was set by the D. C. restorer. However the negative peaks will permit this condenser to discharge through the diode 74 so that the voltage which will finally appear on condenser 75 will be lower in value by an amount corresponding to the peak-to-peak amplitude of the photocell output signal. Thus the greater the contrast, the lower the voltage will be on condenser 75. Delay relay points DR5, which open at the end of the useful scanning period, serve to insure that this voltage will remain at this value throughout the remainder of the printing cycle.

This voltage is applied to the grid 76 of an output tube 77 which, by virtue of its cathode and anode resistors 78 and 79 provides a pair of output terminals 80 and 81. The voltage at cathode output terminal 80 will vary directly with that of condenser 75 and is applied to the control grid 82 of contrast control thyratron 35. The voltage on the cathode 83 of thyratron 35 is obtained from the output 84 of the high contrast correction network 36, which in turn is responsive to the output voltage from the timer 30. As will be later explained, the voltage at terminal 84 tends to follow the output voltage from the timer 30, which, as previously described, has a relatively high positive value at the beginning of the exposure period and falls off linearly as the exposure period progresses. Thus, in the usual case, the voltage on the cathode 83 will initially be higher than that on the grid 82 thus preventing firing of the thyratron. However as the voltage from the timer decreases, a point will be reached where the voltage on the cathode 83 has dropped sufficiently to permit the contrast thyratron to fire. The point of time within the exposure cycle when this will occur obviously depends upon the voltage on the grid 32 which, as previously explained, depends upon the contrast in the negative. The greater the contrast, the lower will be the voltage on grid 82, and consequently the firing of contrast thyratron 35 will not occur until late in the exposure cycle. On the other hand, if the contrast in the negative is relatively low, the voltage on grid 82 will be correspondingly high and contrast thyratron 35 will fire relatively early in the exposure cycle.

As previously explained, firing of thyratron 35 energizes contrast relay CR which, by its points CR1 (Fig. 1) causes energization of solenoid 7 to replace the yellow filter 5 with blue filter 6 so as to increase the effective "hardness" of the paper 4 for the remaining portion of the exposure cycle. Thus the average effective "hardness" of the paper is automatically controlled in accordance with the contrast present in the negative being printed, "soft" negatives being printed "hard" and "contrasty" negatives being printed "soft."

Changing the filter from yellow to blue not only affects the hardness characteristics of the printing paper 4 but also changes the amount of light falling thereon. Unless compensated for, this would mean that the actual exposure would be different for a flat negative than for a contrasty negative, even though the minimum density were the same in each. To correct for this undesired effect, the voltage applied to the grid 63 of the timer pentode 62 is automatically changed when contrast relay CR is actuated. This change of voltage is produced by the opening of contrast relay points CR2 and the simultaneous closing of points CR3 in the input circuit of the timer. This switches the lead to the timer grid 63 from the adjustable voltage divider formed by resistors 85, 86 and 87 to the separately adjustable divider formed by resistors 88, 89 and 90. Resistors 87 and 90, which are in the form of potentiometers, serve as means for individually adjusting the relative proportion of the output voltage at terminal 60 that will appear on the grid 63, prior to and subsequent to the operation of the contrast relay CR.

As previously described, the position of neutral filter 9 is controlled by actuating solenoid 12. The light level relay LL which controls the neutral filter actuating solenoid 12 is itself controlled by the light level thyratron 38. When the print relay PR is energized to start a printing cycle, points PR4 will close to complete the anode circuit for the thyratron 38 and to prepare it for operation. Scanning at this time will be through the yellow, red and neutral filters and, as previously described, a signal, proportional to the photocell output signal will appear at the cathode end of resistor 56 of the cathode follower 52′, with the positive peaks representing the points of minimum density. This voltage is applied to the control grid 92 of thyratron 38 and, if the positive peaks are of sufficient amplitude, they will trigger the thyratron which in turn will energize relay LL to indicate that the negative is not so dark as to prevent high speed printing with the neutral filter in place. If, on the other hand, the least dense part of the negative is too dark for high speed printing through the neutral filter, the positive peaks applied to the thyratron grid 92 will not be sufficient to fire the thyratron and, when reset relay points RR1 close at the end of the preliminary scanning period, a circuit will be completed through points LL1 to energize solenoid 12 and retract the neutral filter. Filter factor relay FF will simultaneously be energized, closing its points FF1, which shunt points LL1, thus insuring that the neutral filter will remain inactive for the rest of the complete cycle.

Removing the neutral filter not only increases the intensity of the light reaching the photocell and the printing paper, but also changes its quality. The photocell 40 and the printing paper 4 are differently affected by this change in quality of the light and, to compensate for this difference, the D. C. level of the photocell signal applied to the exposure control channel and to the contrast control channel is automatically shifted slightly. This compensation is brought about by the closing of points FF2 which apply a positive voltage to one end of potentiometer 93 incorporated in one leg of the gain control network 25. The voltage from potentiometer 93 is applied to the point 115 on the gain control network through a relatively high resistor 93′ to produce corresponding increases in the D. C. level of the signal voltages appearing at potentiometers 51 and 52.

As thus far described the printer and control unit are capable of automatically producing excellent prints from negatives of various degrees of density and contrast. However, the control unit includes additional provisions for extending its useful range with a given grade of variable contrast paper so that negatives which depart quite widely from usually acceptable negatives can also be successfully printed.

Thus, to automatically compensate for non-linear hardness characteristics frequently found with variable-contrast papers, and which tend to overemphasize the contrast in prints made from relatively high contrast negatives, the high contrast correction unit 36 is provided. As shown in Fig. 2, this unit includes a triode 94, the grid 95 of which is connected to a voltage divider, indicated generally at 96, and which is connected across the timer output. Included in one leg of this voltage divider is a diode 97 which, when it is conductive, serves to lower the effective resistance of that portion of the divider below the grid tap 98. Remembering that the timer output voltage is a positive voltage which decreases linearly with respect to time, at some point in the exposure cycle this voltage will drop to a value such that the cathode potential of the diode 97 falls below its anode potential, rendering the diode conductive. The resulting change in the effective resistance of the lower portion of the divider causes a decrease in the rate at which the voltage at the grid tap 98 changes for a given rate of decrease in the timer voltage. This will produce a corresponding decrease in the rate of change of the voltage appearing at the output 84 and which is applied to the cathode 83 of the contrast thyratron 35. With negatives of normal contrast the voltage on grid 82, will, as previously described, be relatively high and the voltage on cathode 83 will have dropped to a value sufficient to trigger thyratron 35 before diode 97 has become conductive. However, where the contrast in the negative is unusually high, the voltage on the thyratron grid will be considerably lower and, before the voltage on cathode 83 (which is following the timer output voltage) drops to a value sufficient to cause firing of the thyratron, the timer output voltage will have fallen to a sufficiently low value to render diode 97 conductive, thereby slowing the subsequent decrease of the voltage on cathode 83. This has the effect of relatively delaying the time at which the contrast relay CR is actuated, so that a relatively larger proportion of the exposure will be through the yellow filter, thereby causing the resulting print to be somewhat less contrasty than would otherwise be true. Potentiometer 99 serves to initially adjust the voltage at the output 84 to the proper D. C. level while potentiometer 100 serves to establish the voltage level at which the circuit through diode 97 becomes effective.

Low contrast correction unit 37 is provided to permit the making of acceptable prints from very flat, low contrast, negatives which are beyond the normal useful range of the paper. To obtain good prints from such negatives, a somewhat shorter exposure time is required than would normally be provided by the unmodified action of the timer. The result is obtained in the control unit shown by automatically increasing the voltage on the grid 101 of exposure control thyratron 67 whenever the contrast as sensed by the peak-to-peak detector 28, falls below a predetermined value.

To this end the low contrast correction unit 37 includes a triode 102, the grid voltage for which is derived from the plate output terminal 81 of the output tube 77 of the peak-to-peak detector 28. Triode 102 has a relatively high resistance plate resistor 103 in series therewith and is so biassed that the tube is normally conductive. A diode 105 has its anode 106 connected to the plate terminal 104 of triode 102 and its cathode 107 connected through a resistor 108 to a source of positive potential. The grid 101 of stop thyratron 32 is connected to the diode end of resistor 108 so that, when diode 105 is nonconducting, the voltage on the thyratron grid and on the diode cathode will be substantially 100 volts. This establishes the normal triggering level of stop thyratron 32, this level remaining the same so long as diode 105 is nonconducting.

By virtue of the fact that triode 102 receives its grid voltage from terminal 81 on the peak-to-peak detector 28, the plate current flowing therethrough will vary directly with the contrast of the negative and the voltage at point 104 will therefore be at a minimum for high contrast negatives and at a maximum for low contrast negatives. The circuit may be adjusted by means of potentiometer 109 (which controls the grid bias on triode 102) so that the voltage at point 104 will be less positive than that on the cathode 107 of diode 105 for contrasts above a predetermined value (thus blocking the diode 105) but will rise above the diode cathode potential when the contrast is below this predetermined value. This renders diode 105 conductive whereupon the voltage on the thyratron grid 101 will be raised to a correspondingly higher value. Thus the stop thyratron will be rendered conductive earlier than normal since the timer output voltage need not fall to so low a value to effect triggering thereof. Variable cathode resistor 110 serves to control the extent to which the exposure period will be shortened once the diode 105 has been rendered conductive.

While, as previously described, the output from the photocell unit 20 is a substantially logarithmic function of the light falling on the photomulplier cathode 50, there is a tendency for the voltage to be somewhat less negative than the true logarithmic value at the low density end of its effective range. To compensate for the combined effect of this departure and the so-called reciprocity failure of the printing paper, a diode-controlled resistance leg 111 is included in the gain control network 25 to permit a certain amount of shaping of the output-input voltage characteristic curve of the network. This leg includes a diode 112 having its anode 113 biassed negative with respect to ground and its cathode 114 facing the photocell output so that the potential thereon will vary with the photocell output signal.

So long as the density of the negative is above a predetermined minimum value, the voltage at point 115 will be sufficiently negative to overcome the negative bias on the diode anode 113 thereby rendering leg 111 conductive. However, whenever the density falls below this value, the diode will be cut off and leg 111 will be rendered ineffective. This has the effect of changing the slope of the output-input voltage characteristics curve of the network so that a given change in input voltage produced by scanning low density portions of a negative will cause a relatively greater change in the network output voltage than would be produced under higher density conditions. The density level at which leg 111 is thus effectively switched into and out of operation is adjustable by means of potentiometer 116 while the degree of compensation is adjustable by means of variable resistor 117. Preferably resistances 116 and 117 will be so adjusted as to slightly over-compensate for the combined effect of the non-logarithmic characteristics of the photocell unit and the reciprocity failure of the paper used, so that extremely thin, low density negatives will be given an even shorter exposure than would normally be the case, thereby producing a somewhat lighter, more pleasing print than would otherwise be obtained.

Potentiometers 118 and 119, which are coupled together for conjoint operation, are used to initially adjust the gain control network for the proper predetermined voltage at point 115 when no negative is in position, thus establishing a predetermined zero-density reference level.

Condensers 121 and 122, which may be selectively connected in parallel with timing condenser 61 by operation of switch 123, serve, when in use, to extend the available timing range of the timer 30.

To extend the effective antilogarithmic characteristics of timing pentode 62 and to compensate for the inherent differences in characteristics between individual tubes, an additional diode-controlled resistance network 124 is provided in the grid circuit of pentode 62. Whenever the voltage at the output 60 of the positive peak detector 26 is below a level determined by the setting of potentiometer 125, the diode 126 will become conductive to lower the effective resistance in the grid circuit and to thereby change the proportion of the output voltage which will be applied to the grid 63 of the timer tube 62 thereby compensating for the deviation of the tube characteristics at these low grid voltages from the anti-logarithmic characteristics desired.

The operation of the control unit during the preliminary scanning, useful scanning and exposure intervals has been fully described in conjunction with the detailed description of the various circuits shown in Fig. 2 and need not be repeated. From this previous description it was seen that both the reset relay RR and the delay relay DR were de-energized throughout the entire exposure interval. However, when the stop relay SR is energized to signal the end of the exposure interval and the beginning of the reset period, reset relay RR is again energized and in turn re-energizes delay relay DR.

The resulting closing of points RR3 discharges condenser 55 in the positive peak detector 26 of the exposure control channel 27 and charges it to a negative potential of 150 volts thus placing it in readiness for the next scanning operation.

The opening of delay relay points DR2 disconnects condenser 59 from condenser 55 while the closing of its points DR3 again connects it to the cathode circuit of tube 58 ready for the next scanning period.

Points DR4 in the timer circuit also open to render timer tube 62 nonconducting, while points RR5 close to discharge the timing condenser 61. This causes the grid voltage on timer output tube 65 to rise to substantially 300 volts positive, causing this tube to draw a relatively heavy current and thereby raising the voltage at point 66 to a correspondingly high value. This voltage appearing on the cathode 67 of stop thyratron 32 is sufficiently high to extinguish this tube and de-energize stop relay SR.

Meanwhile, in the peak-to-peak detector, points RR4 close to insure that the potential on the diode side of condenser 71, some of the charge on which may have leaked off during the exposure cycle, will be at its desired (approximately 100 volt positive) reference level ready for the start of the next scanning interval. Points RR6 and DR5 will also close to restore the potential on condenser 75 to its desired initial value ready for the next cycle of operation.

Points RR7 will also close to apply a sufficiently high positive bias to the cathode terminal 84 of tube 94 in the high contrast correction unit to block this tube, while points RR8 will open to extinguish contrast thyratron 35 and to drop relay CR, thereby causing the return of the yellow filter into operative position.

From the preceding description it will be clear that a photographic printer control system has been provided, which is fully capable of satisfying the objects of the invention. The control system, being primarily electronic in nature, may readily be provided as an adjunct to existing photographic printers of various types or, if desired, it may be incorporated as an integral component of such a printer. Not only are good prints automatically produced by this system from average quality negatives encountered in practice, but even those negatives which are definitely substandard may be successfully printed.

It is again pointed out that specific elements shown in Figure 1 are merely illustrated diagrammatically and that considerable variation in the actual physical relationship of the parts is obviously possible without in any way affecting the operation of the invention. Thus, while the printing paper 4 has been shown as a discrete sheet, it is to be understood that in accordance with the usual practice, the printing paper will normally be supplied in roll form and will be advanced by conventional feeding mechanism, not shown, step-by-step past the printing position. It is, of course, also obvious that a suitable light-tight housing would be provided, where necessary, to prevent outside light from affecting the operation of the unit.

No attempt has been made to show the power supplies for the electronic circuits shown in either Figures 1 or 2. Such power supplies would be quite conventional and are readily commercially available. Moreover, although for purposes of simplification, the various relays and solenoids employed are shown as being of the direct current type, it is obvious that alternating current type relays or solenoids could be substituted for any or all of these elements.

Moreover, it is equally obvious that the individual circuits shown in Figure 2 could be varied quite widely without departing from the spirit of the invention. The exact values of the various resistors and condensers have not been specified, since they will of course, depend upon the particular characteristics of the various vacuum tubes, etc. used in the circuit, selection of the proper values being clearly within the scope of the ability of those skilled in the electronic art.

Other changes or substitutions can obviously be made without departing from the spirit and scope of the invention as defined by the appended claims.

I claim:

1. In a photographic printer for use with spectrally-responsive, variable-contrast, photo-sensitive paper and including an exposure lamp and differently colored filters alternately movable into operative position between the lamp and the paper to control the effective hardness thereof, logarithmic electro-optical scanning means arranged to scan, element by element, the original to be printed and operative to produce an output signal the amplitude of which at any time corresponds with the optical density of the elemental area then being scanned, a peak detector responsive to said output signal for producing an exposure control signal indicative of the minimum optical density of said original, means for initiating the exposure of said sensitized paper to an image of said original through one of said filters, a timer responsive to said exposure control signal and rendered operative upon actuation of said initiating means to produce an output voltage which varies linearly between predetermined initial and final values, the rate of change of said output voltage being controlled by said exposure control signal and being proportional to the antilogarithm of said exposure control signal and therefore of said minimum density, means controlled by said timer for terminating said exposure when said timer output voltage reaches said predetermined final value, and means controlled by the peak-to-peak amplitude of said output signal from said scanning means for shifting said filters at an intermediate point during said exposure.

2. In a photographic printer for use with spectrally-responsive, variable-contrast, photo-sensitive paper and including an exposure lamp and differently colored filters alternately movable into operative position between the lamp and the paper to control the effective hardness thereof, logarithmic electro-optical scanning means arranged to scan, element by element, the original to be printed and operative to produce an output signal the amplitude of which at any time corresponds with the optical density of the elemental area then being scanned, a peak detector responsive to said output signal for producing an exposure control signal indicative of the minimum optical density of said original, means for initiating the exposure of said sensitized paper to an image of said original through one of said filters, a timer responsive to said exposure control signal and rendered operative upon actuation of said initiating means to produce an output voltage which varies linearly between predetermined initial and final values, the rate of change of said output voltage being controlled by said exposure control signal and being proportional to the antilogarithm of said exposure control signal and therefore of said minimum density, means controlled by said timer for terminating said exposure when said timer output voltage reaches said predetermined final value, a peak-to-peak detector responsive to said output signal from said scanning means for producing an output voltage indicative of the density range in said negative, and contrast control means controlled by the outputs of said timer and said peak-to-peak detector for changing said filters when the output voltages therefrom attain a predetermined relationship to one another.

3. In a photographic printer for use with spectrally-responsive, variable-contrast, photo-sensitive paper and including an exposure lamp and differently colored filters alternately movable into operative position between the lamp and the paper to control the effective hardness thereof, logarithmic electro-optical scanning means arranged to scan, element by element, the original to be printed and operative to produce an output signal the amplitude of which at any time corresponds with the optical density of the elemental area then being scanned, a peak detector responsive to said output signal for producing an exposure control signal indicative of the minimum optical density of said original, means for initiating the exposure of said sensitized paper to an image of said original through one of said filters, a timer responsive to said exposure control signal and rendered operative upon actuation of said initiating means to produce an output voltage which varies linearly between predetermined initial and final values, the rate of change of said output voltage being controlled by said exposure control signal and being proportional to the antilogarithm of said exposure control signal and therefore of said minimum density, means controlled by said timer for terminating said exposure when said timer output voltage reaches said predetermined final value, a peak-to-peak detector responsive to said output signal from said scanning means for producing an output voltage indicative of the density range in said negative, and contrast control means controlled by the outputs of said timer and said peak-to-peak detector for changing said filters when the output voltages therefrom attain a predetermined relationship to one another and means controlled by said timer output voltage and rendered effective when said timer output voltage has reached a predetermined intermediate value, for modifying the rate of change of the voltage applied to said contrast control means from said timer to cause a relative delay in the actuation of said contrast control means whenever the density range in said negative exceeds a predetermined value.

4. In a photographic printer for use with spectrally-responsive, variable-contrast, photo-sensitive paper and including an exposure lamp and differently colored filters alternately movable into operative position between the lamp and the paper to control the effective hardness thereof, logarithmic electro-optical scanning means arranged to scan, element by element, the original to be printed and operative to produce an output signal the amplitude of which at any time corresponds with the optical density of the elemental area then being scanned, a peak detector responsive to said output signal for producing an exposure control signal indicative of the minimum optical density of said original, means for initiating the exposure of said sensitized paper to an image of said original through one of said filters, a timer responsive to said exposure control signal and rendered operative upon actuation of said initiating means to produce an output voltage which varies linearly between predetermined initial and final values, the rate of change of said output voltage being controlled by said exposure control signal and being proportional to the antilogarithm of said exposure control signal and therefore of said minimum density, means controlled by said timer for terminating said exposure when said timer output voltage reaches said predetermined final value, a peak-to-peak detector responsive to said output signal from said scanning means for producing an output voltage indicative of the density range in said negative, and contrast control means controlled by the outputs of said timer and said peak-to-peak detector for changing said filters when the output voltages therefrom attain a predetermined relationship to one another, and means responsive to output voltage from said peak-to-peak detector for modifying the response of said exposure terminating means to said timer output voltage to advance the time of operation thereof whenever the density range in said negative falls below a predetermined value.

5. A control system for a photographic printer for use with variable-contrast paper and including contrast control means for varying the effective hardness of said paper, comprising logarithmic electro optical scanning means for producing a scanning signal the amplitude of which varies substantially linearly with the element-to-element density of the original to be printed, means responsive to said scanning signal for producing a first control voltage, the value of which relative to a given reference voltage is directly proportional to the peak-to-peak amplitude of said scanning signal, means responsive to said scanning signal and rendered effective upon initiation of a printing operation for generating a second control voltage which varies linearly between predetermined initial and final values at a rate directly proportional to the anti-logarithm of the amplitude, relative to a reference signal level, of the signal peak corresponding to minimum density, means controlled conjointly by said first and second control voltages for actuating said contrast control means, and means responsive to said second control voltage attaining said final value for terminating said printing operation.

6. A control system for a photographic printer for use with variable-contrast paper the effective hardness of which is dependent upon the spectral characteristics of the light used for exposing said paper, comprising logarithmic electro optical scanning means for producing a scanning signal the amplitude of which varies substantially linearly with the element-to-element density of the original to be printed, means responsive to said scanning signal for producing a first control voltage, the value of which relative to a given reference voltage is directly proportional to the peak-to-peak amplitude of said scanning signal, means responsive to said scanning signal and rendered effective upon initiation of a printing operation for generating a second control voltage which varies linearly between predetermined initial and final values at a rate directly proportional to the anti-logarithm of the amplitude, relative to a reference signal level, of the signal peak corresponding to minimum density, contrast control means controlled conjointly by said first and second control voltages and operative when said control voltage attains a predetermined value relative to said first control voltage to alter the spectral characteristics of said light so as to cause said paper to assume a different effective hardness for the remainder of the printing operation, means responsive to operation of said contrast control means for changing the linear rate at which said first control voltage changes for the remainder of said printing operation, and means responsive to said first control voltage attaining said final value for terminating said printing operation.

7. In a photographic printer for use with spectrally-responsive variable-contrast paper, scanning means arranged to scan, element by element, the original to be printed and including logging means operative to produce an output signal the amplitude of which varies substantially linearly with the element-to-element optical density of said original, a peak detector responsive to said output signal for producing an exposure control voltage indicative of the minimum optical density of said original, means for initiating exposure of said paper to light of given spectral characteristics and intensity modulated by said original, a timer rendered operative upon actuation of said exposure initiating means and responsive to said exposure control voltage to produce a timer output voltage which varies linearly from a predetermined initial value at a rate proportional to the anti-logarithm of said exposure control voltage, a peak-to-peak detector responsive to the output signal from said scanning means to produce a contrast control voltage indicative of the density range in said original, means responsive to said contrast control voltage and said timer output voltage for altering the spectral characteristics of said light when said timer output voltage reaches a given value relative to said contrast control voltage, and means responsive to said timer output voltage for terminating said exposure when said timer output voltage reaches a predetermined final value.

8. In a printer for making photographic prints of originals on variable-contrast printing paper, logarithmic electro-optical scanning means arranged to scan, element by element, the original to be printed and operative to produce an output signal the amplitude of which varies substantially linearly with the element-to-element optical density of said original, a peak detector responsive to said output signal for producing an exposure control signal indicative of the minimum optical density of said original, means for initiating the photographic printing of said original, a timer rendered operative upon actuation of said initiating means, said timer being controlled by said exposure control signal to define a timing interval the duration of which is proportional to the anti-logarithm of said exposure control signal, a peak-to-peak detector responsive to the output signal from said scanning means to produce a contrast control signal indicative of the density range in said original, means controlled by said timer for terminating the photographic printing at the expiration of said timing interval, and means responsive to said contrast control signal for controlling the average effective hardness of said variable-contrast paper during said timing interval in accordance with the density range in said original.

9. In a photographic printer, logarithmic electro-optical scanning means arranged to scan, element by element, the original to be printed and operative to produce an output signal the amplitude of which varies substantially linearly with the element-to-element optical density of said original, a peak detector responsive to said output signal for producing an exposure control signal indicative of the minimum optical density of said original, means for initiating the photographic printing of said original, a timer rendered operative upon actuation of said initiating means, said timer being controlled by said exposure control signal to define a timing interval the duration of which is proportional to the anti-logarithm of said exposure control signal, and means controlled by said timer for stopping said photographic printing at the expiration of said timing interval.

10. In a photographic printer, logarithmic electro-optical scanning means arranged to scan, element by element, the original to be printed and operative to produce an output signal the amplitude of which varies substantially linearly with the element-to-element optical density of said original, a peak detector responsive to said output signal for producing an exposure control signal indicative of the minimum optical density of said original, a timing capacitor, a charging circuit for said capacitor including a grid-controlled, variable-mu pentode having its anode circuit in series with said capacitor and its control grid responsive to said exposure control signal whereby, when said pentode is conductive the charge on said capacitor will vary linearly at a rate proportional to the anti-logarithm of said exposure control signal, means for initiating the photographic printing of said original and simultaneously rendering said pentode conductive, and means responsive to a predetermined change in the charge on said capacitor to terminate said photographic printing.

References Cited in the file of this patent

UNITED STATES PATENTS

| | | |
|---|---|---|
| 2,565,399 | Simmon | Aug. 21, 1951 |
| 2,757,571 | Loughren | Aug. 7, 1956 |
| 2,764,060 | Horak | Sept. 25, 1956 |